United States Patent [19]

Schierling et al.

[11] 4,378,061

[45] Mar. 29, 1983

[54] FLUID PRESSURE CLUTCH

[75] Inventors: Bernhard Schierling, Unterpleichfeld; Kurt Fädler, Niederwerrn, both of Fed. Rep. of Germany

[73] Assignee: Fichtel & Sachs AG, Schweinfurt, Fed. Rep. of Germany

[21] Appl. No.: 207,776

[22] Filed: Nov. 17, 1980

[30] Foreign Application Priority Data

Nov. 23, 1979 [DE] Fed. Rep. of Germany ....... 2947242

[51] Int. Cl.³ ................. F16D 25/061; F16D 25/064; F16D 7/02
[52] U.S. Cl. ............................... 192/85 AA; 192/48.5; 192/53 R; 192/56 F; 192/70.14
[58] Field of Search ............ 192/85 AA, 85 A, 53 R, 192/56 F, 48.5, 48.7, 70.14, 70.21

[56] References Cited

U.S. PATENT DOCUMENTS

| | | | |
|---|---|---|---|
| 2,180,086 | 11/1939 | Kraft | 192/70.14 X |
| 3,360,087 | 12/1967 | Hilpert | 192/85 AA X |
| 3,664,474 | 5/1972 | Blake et al. | 192/56 F |
| 4,245,729 | 1/1981 | Lunke et al. | 192/85 A X |

FOREIGN PATENT DOCUMENTS 998,561 7/1965 United Kingdom .
1530224 10/1978 United Kingdom .

*Primary Examiner*—Rodney H. Bonck
*Attorney, Agent, or Firm*—Toren, McGeady and Stanger

[57] ABSTRACT

In a clutch mechanism for rotatably coupling a pair of shafts by engagement between a first and a second frictional engaging element each rotatably affixed, respectively, to one of the shafts, there is provided a fluid pressure mechanism for establishing frictional connection between the first and second engaging elements. A rotary valve mechanism including a first and a second valve component operates to prevent slippage between the first and second frictional engaging elements only when the first and second valve components are in a particular angular relationship relative to each other where the fluid flow cross-section through the rotary valve mechanism is a minimum. Additionally, rotary lock means may be provided for releasably locking the first and second frictional engaging elements together when slippage therebetween is prohibited by the positioning of the valve components of the rotary valve mechanism.

21 Claims, 5 Drawing Figures

FLUID PRESSURE CLUTCH

The present invention relates generally to fluid clutch mechanisms and, more particularly, to a clutch or coupling device for rotatably joining two shafts together. In a device of the type to which the present invention relates, each of the shafts has rotatively affixed thereto at least one frictional surface element and a friction surface pressure mechanism is provided for establishing a frictional connection between the two frictional surface elements. This frictional surface pressure mechanism may comprise a first pressure chamber to be connected to a pressure medium source and friction surface pressure elements admitted by the pressure in this first chamber.

A coupling device of the type to which the present invention relates is known from German Gebrauchsmuster 69 44 475.

The present invention is directed toward the provision of a coupling device of the type described wherein the two shafts may be automatically set at a defined relative angular position during coupling.

SUMMARY OF THE INVENTION

Briefly, the present invention may be described as a clutch or coupling mechanism for rotatively coupling a pair of shafts together comprising first and second frictional engaging means each rotatively fixed, respectively, to one of said shafts, fluid pressure means for establishing frictional connection between said first and second frictional engaging means, said fluid pressure means comprising pressure chamber means and fluid pressure source means for admitting fluid under pressure to said chamber means, rotary valve means comprising a first and a second valve component rotatable relative to each other and each rotatively coupled, respectively, with one of said shafts. The rotary valve means operate so that at at least one relative angular position between the first and the second valve components, the flow cross-section through the rotary valve means is at a minimum value so that fluid pressure medium admitted to the chamber means by the fluid pressure source means can only assume a level prohibiting slippage between the first and second frictional engaging means when the valve components assume a certain relative angular position and when the pair of shafts are set in a defined relative angular position due to the defined relative angular positioning of the valve components.

Thus, in the solution provided by the present invention, a first pressure chamber of the pressure chamber means is provided with a delivery valve system whose rotary valve has a variable cross-section. This rotary valve is formed by two valve components, each coupled to a shaft, and the flow cross-section of the rotary valve having a minimum value at least at a certain relative angular position is arranged in such a way that, when the first pressure chamber is admitted with a pressure medium, the pressure in the first pressure chamber can only assume a value that prevents slippage of the frictional surfaces when the valve components assume the defined relative angular position therebetween corresponding to the defined relative angular position of the valve components.

In the coupling device according to the invention, there is at first only slight frictional engagement between the two shafts so that an easily controllable speed adjustment is possible. Only after the defined angular position has been reached are the shafts brought into a substantially slippage-free connection by frictional engagement so that the defined angular position of the two shafts is maintained.

In accordance with another feature of the invention, it is possible to provide the coupling device with a locking mechanism which will lock the two shafts rotatively together in a defined relative angular position. This lock means can be moved into an operating position after the frictional connection between the frictional surfaces of the clutch has been established and the defined relative angular position between the shafts has been reached. A measure such as this ensures the maintenance of the relative angular positioning between the two shafts once such a position has been set.

Of course, it should be understood that the fluid pressure medium referred to herein may be a hydraulic pressure medium or a pneumatic pressure medium.

A further object of the invention is to design a coupling device so that no axial forces will need to be transmitted between the two shafts in an adaptation of the friction surfaces.

The invention is particularly intended to provide an arrangement which is structurally simple, which will save space, and which will provide reliable coupling between the shafts.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
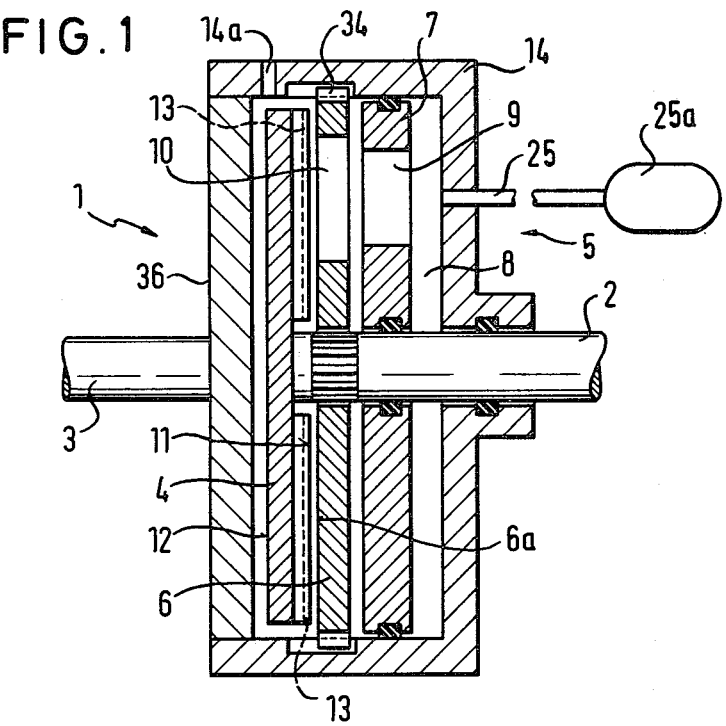
FIG. 1 is a longitudinal sectional view showing a hydraulically operated friction clutch in accordance with the present invention.

FIG. 1 shows a basic arrangement for a hydraulic friction clutch 1 structured in accordance with the present invention. The clutch is intended to rotatively couple a first shaft 2 with a second shaft 3. A clutch disc 4 is rotatively fixed upon the first shaft 2 and a flywheel 36 which carries a clutch housing 14 is rigidly connected with the other shaft 3.

The clutch housing 14 encloses a pressure chamber 8 within which an annular piston 7 is axially displaceable, with the piston 7 being in sealed engagement both with the shaft 2 and with the clutch housing 14. Between the annular piston 7 and the clutch disc 4 there is arranged a pressure plate 6. The pressure plate 6 is rotatively fixed, but axially displaceable, relative to the clutch housing 14 by means of teeth 34. The pressure chamber 8 is provided with a feed pipe 25 which operates to admit a fluid medium, in the embodiment depicted the fluid medium being a hydraulic medium. The feed pipe 25 is connected to a fluid source or container 25a which contains compressed hydraulic fluid with which a hydraulic control mechanism of the invention generally labeled 5 may be supplied.

The annular piston 7 is formed with a throttled connecting passage 9 extending between the pressure chamber 8 and the pressure plate 6. An opening 10 in the pressure plate 6 corresponds with the connecting passage 9, the opening 10 being designed, for example, as a radial slot as best seen from FIG. 2. In principle, other forms of the radial slot 10 are possible and the radial slot 10 is formed to extend radially over a distance which is less than the radial extension of a friction surface 11 of the clutch disc 4 located opposite the pressure plate 6.

Arranged in the friction surface 11 of the clutch disc 4 are drain passages 13 for passage therethrough of the pressure medium, with the passages 13 extending over the entire radial distance of the friction surface 11. On the opposite side of the clutch disc 4 there is provided a friction surface 12 which is arranged in opposed relationship with the flywheel 36 and which has no particular characteristics.

The drain passages 13 in the friction surface 11 are so designed that they will establish in all but a specified relative angular position between the pressure plate 6 and the clutch plate 4 a flow passage extending between the opening 10 in the pressure plate 6 and the interior of the clutch housing 14.

The clutch housing 14 is formed with a fluid flow outlet 14a.

In the operation of the angular-synchronous coupling of the two shafts 2 and 3 by the device of the present invention, hydraulic medium is introduced into the pressure chamber 8 and the annular piston 7 is displaced in a direction toward the pressure plate 6 due to the pressure drop occurring through the connecting passage 9. As a result, the annular piston 7 is brought to bear against the pressure plate 6 and the pressure plate 6 moves against the clutch disc 4. Accordingly, the annular piston 7, the pressure plate 6, the frictional surface 11, the frictional surface 12, and the flywheel 36 will thus bear one upon another successively, assuming that the shafts 2 and 3 are displaceable relative to each other.

The pressure thus produced is relatively low since the hydraulic medium can escape from the pressure chamber 8 through the connecting passage 9, opening 10, and drain passages 13. As long as this possibility exists, only a small torque is transmitted from the revolving shaft to the stationary shaft and there is a gradual adjustment of the speed of the shafts.

The clutch is thus gently engaged, but the engagement process is not as yet completed. At the moment when the opening 10 in the pressure plate 6 moves within a range of the friction plate 11 where there are no drain passages 13 provided, this range being designated 15 in FIG. 3, the pressure medium can no longer escape from the pressure chamber 8 and there is a stronger pressure increase in this chamber. As a result of the pressure increase, the pressure plate 6 is forced in nonrotatable engagement with the clutch disc 4 and the clutch disc 4 is engaged against the flywheel 36 with the frictional surfaces 11 and 12 on opposite sides thereof being in frictional engagement, respectively, with the oppositely positioned members. The angular-synchronous connection between the shafts may thus be established if the adjustment of the speeds of the shafts has advanced far enough. If this is not the case, a further relative movement between the two shafts 2 and 3 through a 360° rotation may occur with subsequent fixed coupling of the two shafts following when the radial slot 10 overlies an area having no drain passages, such as the area 15 shown in FIG. 3.

Figure 2:
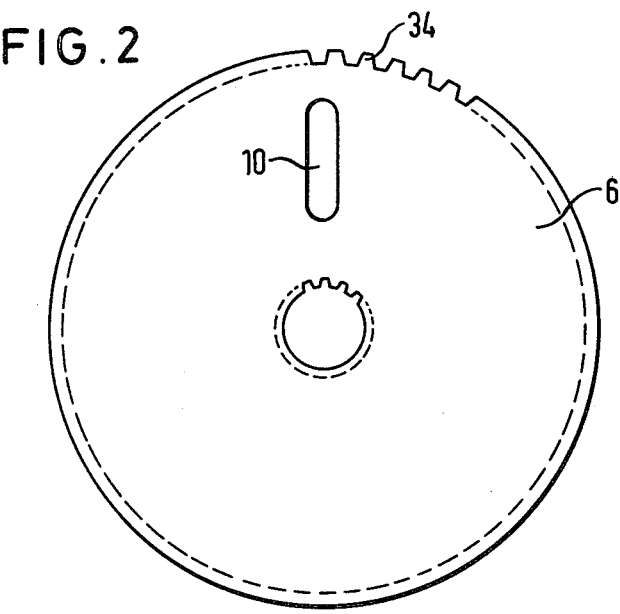
FIG. 2 is a plan view of a pressure plate of the clutch assembly of FIG. 1.
Figure 3:
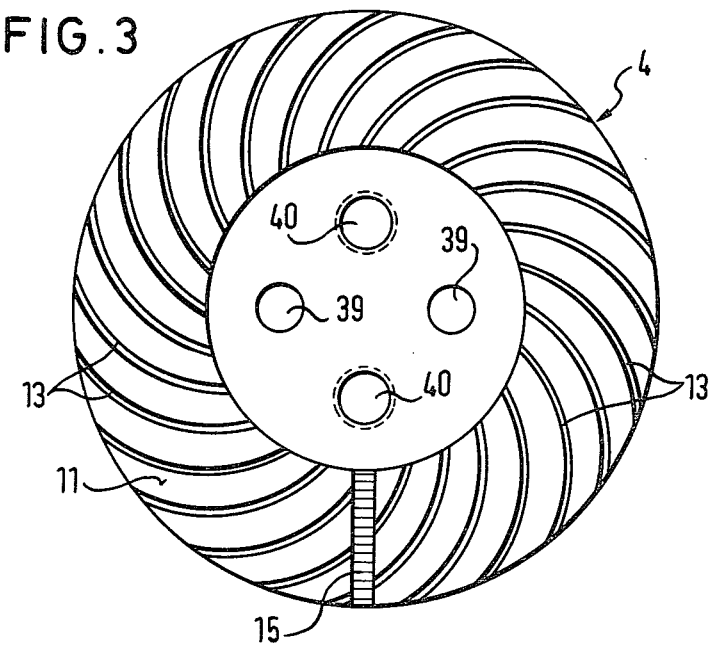
FIGS. 3 and 4 are plan views showing, respectively, different clutch discs which may be utilized with the present invention.

FIG. 3 depicts a clutch disc 4 and shows the frictional surface 11 thereof. Frictional surface 11 is formed with a series of drain passages 13 and, in a preferred embodiment of the invention, the drain passages are preferably curved with each individual drain passage extending over a certain angular range of the disc 4. This will ensure that the opening 10 of the pressure plate 6, as shown in FIG. 2, will always provide a flow passage through the interior of the frictional clutch 1 through at least one of the drain passages. The only exception to this is the zone 15 of the frictional surface 11 where no drain passages are provided. The zone 15 is equivalent to or slightly larger than the opening 10 in the pressure plate 6 so that when the opening 10 overlies the zone 15, no fluid flow can occur through the interior of the friction clutch and stoppage will occur between the pressure plate 6 and the clutch disc 4 during the engagement process. On the radially inner portion of the friction surface 11, the clutch disc 14 is provided with two bores 39 for fitting corresponding pins in order to fasten the clutch disc on the shaft 2 and also with two bores 40 for receiving corresponding screws 38.

Figure 4:
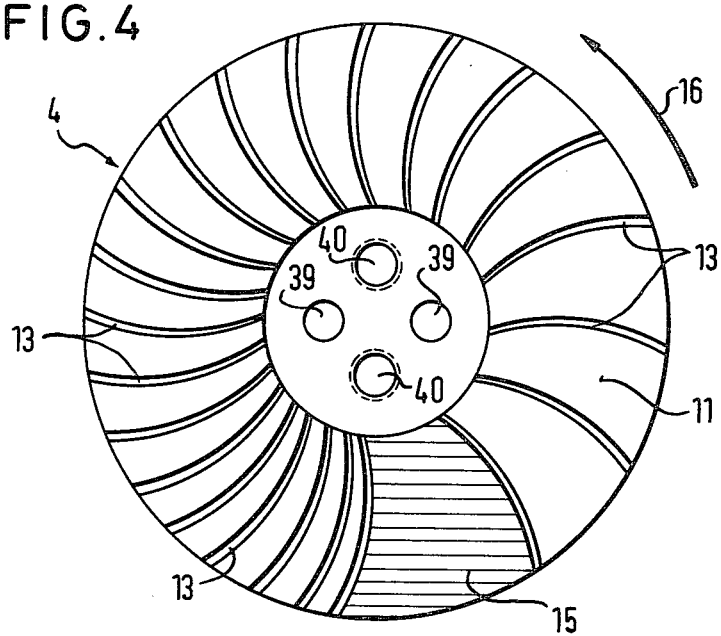

FIG. 4 shows a further embodiment of a clutch disc 4 in accordance with the present invention. In this embodiment, the drain passages in the frictional surface 11 are likewise curved, but the distances between each drain passage are different. Assuming relative movement of the clutch disc 4 in the direction of the arrow 16 relative to the pressure plate 6, the relative distances between the individual drain passages 13 will constantly increase until, in the zone 15, the greatest relative distance will be achieved and the opening 10 in the pressure plate 6 will thus be completely sealed during the engaging process. Such a design will permit a particularly short delay or acceleration during coupling between the two shafts 2 and 3 since the greatest pressure loss in the pressure medium will appear in the range of the small distances between the individual drain passages 13, while this pressure loss is lower the fewer drain passages which are covered by the opening 10 in the pressure plate 6. Such an embodiment permits a particularly angular-synchronous coupling of the two shafts. The face of the pressure plate 6 which faces the clutch disc 4 is designated as 6a.

Figure 5:
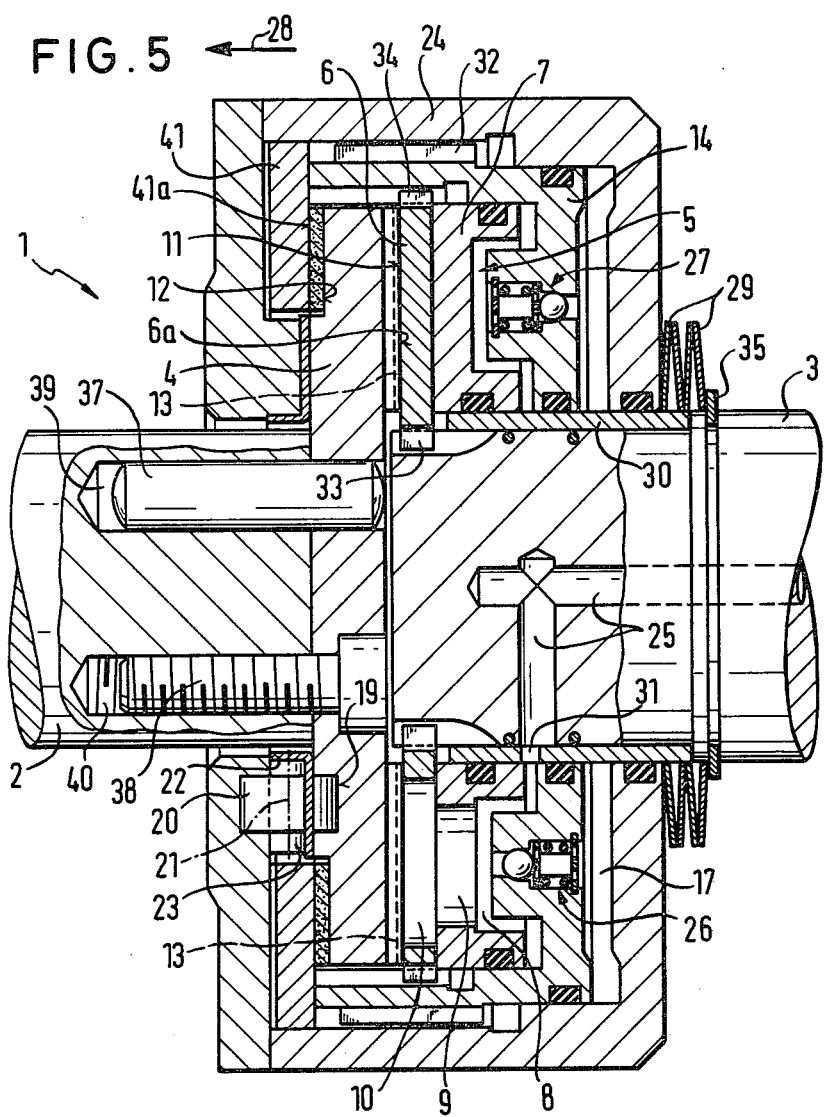
FIG. 5 is a sectional view taken through another embodiment of a clutch assembly in accordance with the invention.

FIG. 5 is a sectional view of another embodiment of a friction clutch 1 in accordance with the present invention.

A pressure plate 6 is mounted on a shaft 3 by means of teeth 33 with the pressure plate being axially displaceable but rotatably fixed relative to the shaft 3. The pressure plate 6 includes teeth 34 which engage with the outer circumference of the pressure plate 6 the clutch housing 14 again in a nonrotatable but axially displaceable manner. Between the clutch housing 14 and the pressure plate 6 there is arranged an annular piston 7 which is axially displaceable in the clutch housing 14 and which is sealingly engaged therewith. Both the annular piston 7 and the clutch housing 14 are mounted on shaft 3 with a tubular shaft 30 being interposed therebetween in sealed engagement. The hollow shaft 30 is also in sealed engagement with the shaft 3. The clutch housing 14 extends about the clutch disc 4 which is rotatively affixed to the shaft 2. The capability for free axial displacement of the clutch housing 14 enables actuation of the clutch free from axial forces.

In addition, an annular cylinder 24 is arranged concentrically with the clutch housing 14 to be axially displaceable relative thereto but connected therewith in a rotatively fixed manner in the circumferential direction by means of teeth 32. The annular cylinder 24 forms with the clutch housing 14 a cylindrical space 17 which is likewise sealed about the hollow shaft 30.

Between the pressure chamber 8 and the cylindrical chamber 17 there are arranged two valve systems 26 and 27, each of which comprise a nonreturn valve, with both nonreturn valves being arranged to effect fluid flow in opposite directions.

Rigidly connected with the clutch housing 14 there is provided a counterpressure plate 41 also enclosed within the annular cylinder 24 and adapted to be selectively brought into locking connection with the clutch disc 4 in a manner to be more fully described hereinafter. This locking connection is effected by means of one or more radially extending grooves 19 in the clutch disc 4 as well as corresponding position rollers 20 in the annular cylinder 24. The grooves 19 may, for example, have a V-shaped configuration. The position rollers 20 are rotatably mounted upon journals 23 having pivots 21 which likewise extend in the radial direction. All of the position rollers 20 are fixed in their position by a cage 22.

The annular piston 7 is provided with a connecting passage 9 which establishes a flowpath between the pressure chamber 8 and the opening 10 in the pressure plate 6. The opening 10 is smaller in the radial direction than the frictional surface 11 of the clutch disc 4 which has the drain passages 13 formed therein, in accordance with the embodiment shown in FIGS. 1 and 2. In the present case, the frictional surface 12 taken together with the counterpressure plate 41, as seen in the radial direction, is narrower than the frictional surface 11 in order to enable the parts to be accommodated for the interlocking connection radially inside this frictional surface 12 in the clutch disc 4 and the annular cylinder 24, respectively. The annular cylinder 24 is spring biased for movement in the direction of the arrow 28 by a spring 29 which is, in turn, engaged against a stop member 35 on the shaft 3.

Additionally, the shaft 3 is provided with feed pipes 25 through which pressure medium is supplied to the clutch assembly. For the same purpose, the hollow shaft 30 is formed with a bore 31 which connects the feed pipe 25 with the pressure chamber 8. The clutch disc 4 is connected, for example through fitting pins 37 and screw 38, with the shaft 2. The clutch housing 14 may have an outlet similar to the outlet 14a shown in FIG. 1.

In the operation of the present embodiment of the friction clutch in order to effect angular-synchronous connection of the shafts 2 and 3, pressure medium is introduced into the feed pipe 25 from the exterior of the clutch. This pressure medium flows through the bore 31 into the pressure chamber 8. Pressure rise in the pressure chamber 8 will effect an axial displacement between the clutch housing 14 and the annular piston 7 relative to each other, the valve assembly being closed in this case by corresponding spring tension. Clutch disc 4 is thus clamped at its frictional surfaces 11 and 12 between the faces 6a and 41a of the pressure plate 6 or counterpressure plate 41. The pressure rise in the pressure chamber 8 is, however, limited by the fact that the pressure medium can escape into the interior of the clutch through the connecting passages 9 and the opening 10 as well as through the drain passages 13. Only when the opening 10 in the pressure plate 6 is covered by the zone 15 of the friction surface 11 of the disc 4, wherein no drain passages 13 are provided, does a further substantial pressure increase occur in the pressure chamber 8.

This increased pressure has two effects. First of all, the pressure between the pressure plate 6, the counterpressure plate 41, and clutch disc 4 increases immediately so that relative movement between the shafts 2 and 3 is practically stopped as soon as the opening 10 is covered by the zone 15. Secondly, the valve assembly 26 opens and thus permits passage of pressure medium from the pressure chamber 8 into the cylindrical chamber 17.

It thus becomes possible for the annular cylinder 24 to be moved against the initial stress of the spring 29 opposite to the direction indicated by the arrow 28. This permits interlocking engagement between the position rollers 20 within the corresponding grooves 19 in the clutch disc 4. In this manner, a satisfactory and exact angular synchronous locking is established between the shafts 2 and 3.

In order to disengage the shafts 2 and 3, it is only necessary to reduce the pressure in the pressure chamber 8 so that the annular cylinder 24 immediately moves under the stress of the spring 29 in the direction of the arrow 28 to open the interlocking connection between the pressure plate 41 and the clutch disc 4. The pressure medium will flow from the cylindrical chamber 17 through the valve assembly 27 back into the pressure chamber 8 and from there into the feed pipes 25. At the same time, the pressure on the friction surfaces 11 and 12 of clutch disc 4 will drop so that the latter may freely move relative to the shaft 3.

At an overload condition, position rollers 20 are arranged so that they may disengage from the grooves 19 and annular cylinder 24 is displaced to the left relative to clutch housing 14, as seen in FIG. 5, with the pressure medium returning from the pressure chamber 17 through valve assembly 27 into pressure chamber 8. However, it is also possible to design the interlocking engagement between the annular cylinder 24 and the clutch disc 4 so that it will not become disengaged at overload.

While specific embodiments of the invention have been shown and described in detail to illustrate the application of the inventive principles, it will be understood that the invention may be embodied otherwise without departing from such principles.

What is claimed is:

1. A clutch mechanism for rotatably coupling a pair of shafts comprising: first and second frictional engaging means each rotatively fixed, respectively, to one of said shafts; fluid pressure means for establishing frictional connection between said first and second frictional engaging means, said fluid pressure means comprising pressure chamber means and fluid pressure source means for admitting fluid under pressure to said chamber means; rotary valve means comprising a first and a second valve component rotatable relative to each other and each rotatively coupled, respectively, with one of said shafts; said rotary valve means being arranged so that at at least one relative angular position between said first and said second valve components, the flow cross-section defined through said rotary valve means is at a minimum value so that fluid pressure medium admitted to said chamber means by said fluid pressure source means can assume a level prohibiting slippage between said first and second frictional engaging means only when said valve components assume a certain relative angular position and when said pair of shafts are set in a defined relative angular position due to the defined relative angular position of said valve components.

2. A mechanism according to claim 1 further including a locking mechanism for locking said shafts together in said defined relative angular position, said locking means being adapted to be moved into an operative position after the frictional connection between said frictional engaging means has been established and the defined relative angular position between said shafts has been achieved.

3. A mechanism according to claim 2 wherein said locking mechanism is adapted to be actuated by a control mechanism having said pressure medium admitted thereto.

4. A mechanism according to claim 3 wherein said locking control mechanism has admitted thereto pressure medium from said pressure chamber means and acts to lock the shafts together when the pressure in said pressure chamber means has attained a predetermined value.

5. A mechanism according to claim 4 wherein said pressure chamber means comprise a first pressure chamber and wherein said locking control mechanism comprises a second pressure chamber and actuating elements responsive to pressure in said second pressure chamber, said second pressure chamber being connected with said first pressure chamber by a relief pressure valve, said relief pressure valve opening from said first pressure chamber to said second pressure chamber when a predetermined pressure in said first pressure chamber has been exceeded.

6. A mechanism according to claims 3, 4, or 5 further comprising biasing means for biasing said locking mechanism in the inoperative position thereof where said shafts are not locked together, said locking mechanism being moved by said locking control mechanism into the operative position for locking said shafts together.

7. A mechanism according to claim 5 further comprising a second pressure relief valve connected to said second pressure chamber to permit escape of pressure medium from said second pressure chamber when a predetermined pressure difference is exceeded.

8. A mechanism according to claim 7 wherein said second pressure relief valve opens from said second pressure chamber to said first pressure chamber and is adapted to be brought to its closing position both by a valve prestressing device and by pressure in said first pressure chamber.

9. A mechanism according to claim 2 wherein said locking mechanism is designed with an overload function and operates to lock said two shafts together only up to a certain level of transmitted torque to be transmitted by said mechanism whereupon overload disengagement of said shafts is effected.

10. A mechanism according to claim 1 wherein said first and second frictional engaging means comprise frictional surfaces which extend substantially perpendicularly to the longitudinal axes of said shafts.

11. A mechanism according to claim 1 wherein at least one of said first and second frictional engaging means is arranged to be axially displaceable relative to one of said shafts.

12. A mechanism according to claim 1 wherein said fluid pressure means operates to apply a pressure force for establishing said frictional connection which acts against only one of said frictional engaging means and one of said shafts.

13. A mechanism according to claim 1 wherein said minimum value of the flow cross-section through said rotary valve means is substantially zero.

14. A mechanism according to claim 1 wherein each of said first and second frictional engaging means include a frictional surface extending generally perpendicularly and coaxially with the axis of said shafts, wherein said frictional surfaces are designed to bear against each other, wherein pressure medium drain passages are arranged in a first of said frictional surfaces which are open toward the other of said frictional surfaces, wherein the outflow cross-section per unit of circumference of said first frictional surface varies over its entire circumference and wherein an opening connected with said pressure chamber means is provided in said other frictional surface which bears on different circumferential sections of said first frictional surface depending upon the relative positioning of said shafts.

15. A mechanism according to claim 14 wherein said frictional surfaces are pressed against each other by a driving force exerted by said fluid pressure means on said frictional surfaces.

16. A mechanism according to claim 15 wherein at least part of said frictional surfaces is formed by valve faces.

17. A mechanism according to claim 14 wherein said first frictional engaging means comprises a clutch disc connected to a first of said pair of shafts and defining said first frictional face, wherein said second frictional engaging means comprises a pressure plate rotatively fixed but axially displaceable relative to the other of said pair of shafts and defining said other frictional surface, wherein said mechanism further comprises an annular piston arranged to bear on said pressure plate on a side thereof remote from said first frictional surface, wherein said annular piston is exposed to pressure in said pressure chamber means, wherein a cylinder housing is arranged on said other of said pair of shafts to receive said pressure chamber means and said annular piston and wherein an opening is provided in said pressure plate which is in communication with a connecting passage extending through said annular piston.

18. A mechanism according to claim 14 wherein said first frictional engaging means comprise a clutch disc rotatively fixed on a first of said pair of shafts and defining said first frictional surface, wherein said second frictional engaging means comprise a pressure plate connected to be axially displaceable but rotatively fixed relative to the other of said pair of shafts and defining said second frictional surface, wherein said pressure plate bears with its face remote from said second frictional surface on an annular piston which is exposed to fluid pressure in said pressure chamber means, wherein said clutch disc is formed with a second frictional surface on its face remote from said first frictional surface, wherein said second frictional surface is arranged opposite the frictional surface of a counterpressure plate, wherein said counterpressure plate is connected to be axially displaceable but rotatively fixed relative to the other of said pair of shafts, wherein said counterpressure plate is also rigidly connected in the axial direction with a cylindrical housing of said clutch mechanism defining said pressure chamber means and having said annular piston located therein, and wherein said pressure plate is formed with an opening in flow communication with a connecting passage formed through said annular piston.

19. A mechanism according to claims 17 or 18 wherein said clutch disc is formed with drain passages on said first frictional surface thereof extending in a curved radial path and wherein said pressure plate is formed with a radial slot extending therethrough adapted to be brought in flow communication with said drain passages.

20. A mechanism according to claim 18 wherein a locking housing is mounted for axial displacement on said cylindrical housing in order to form together with said cylindrical housing second pressure chamber means, with said mechanism further comprising a locking mechanism cooperating with said locking housing and said clutch disc.

21. A mechanism according to claim 20 wherein said cylinder housing is annularly enclosed by said locking housing designed as an annular cylinder.

* * * * *